United States Patent
Stalker et al.

(10) Patent No.: US 10,187,693 B2
(45) Date of Patent: Jan. 22, 2019

(54) CONTENT ACCESS CONTROL

(71) Applicant: Cisco Technology, Inc., San Jose, CA (US)

(72) Inventors: Altan Stalker, Lawrenceville, GA (US); Stephen Tallamy, Sandhurst (GB); Andrew Valentine, Eastleigh (GB)

(73) Assignee: SYNAMEDIA LIMITED, Middlesex (GB)

(*) Notice: Subject to any disclaimer, the term of this patent is extended or adjusted under 35 U.S.C. 154(b) by 0 days.

(21) Appl. No.: 14/979,590

(22) Filed: Dec. 28, 2015

(65) Prior Publication Data

US 2017/0188100 A1    Jun. 29, 2017

(51) Int. Cl.

| | |
|---|---|
| H04N 21/4627 | (2011.01) |
| H04N 21/435 | (2011.01) |
| H04N 21/45 | (2011.01) |
| H04N 21/454 | (2011.01) |
| H04N 21/4545 | (2011.01) |
| H04N 21/462 | (2011.01) |

(52) U.S. Cl.
CPC ....... *H04N 21/4627* (2013.01); *H04N 21/435* (2013.01); *H04N 21/4532* (2013.01); *H04N 21/4542* (2013.01); *H04N 21/45457* (2013.01); *H04N 21/4622* (2013.01)

(58) Field of Classification Search
CPC ......... H04N 21/2665; H04N 21/44222; H04N 21/4532; H04N 21/454; H04N 21/4622; H04N 21/4627; H04N 21/4542
See application file for complete search history.

(56) References Cited

U.S. PATENT DOCUMENTS

| | | | | |
|---|---|---|---|---|
| 5,434,678 A | * | 7/1995 | Abecassis | ............... A63F 13/10 348/E5.102 |
| 5,610,653 A | * | 3/1997 | Abecassis | ............... A63F 13/10 348/170 |

(Continued)

OTHER PUBLICATIONS

Reviews & Age ratings—Best Movies, Apps, Games for Kids, 2015, available on the worldwide web at: https://www.commonsensemedia.org.

(Continued)

*Primary Examiner* — Benjamin R Bruckart
*Assistant Examiner* — Jen-Shi Huang
(74) *Attorney, Agent, or Firm* — Merchant & Gould P.C.

(57) ABSTRACT

In one embodiment, a method for controlling access to media content includes defining a viewing profile for at least one viewing user according to a multiplicity of attributes associated with the media content, assigning allowable limits to the multiplicity of attributes in the viewing profile, where each of the allowable limits indicates a rating limit for one of the multiplicity of attributes, receiving attribute ratings associated with a media content item, where each of the attribute ratings is associated with one of the multiplicity of attributes, determining viewing permissibility for the media content item by the at least one viewing user by comparing the attribute ratings with the allowable limits, and based on the viewing permissibility, allowing or disallowing the at least one viewing user to view the media content item.

14 Claims, 3 Drawing Sheets

| ATTRIBUTE | ALLOWABLE LIMIT | CONTACT LIMIT | MANDATORY |
|---|---|---|---|
| NUDITY | 2 | 5 | |
| VIOLENCE | 1 | 4 | |
| LANGUAGE | 1 | 3 | |
| ALCOHOL | 3 | 6 | |
| DRUGS | 1 | 4 | YES |
| RACISM | 1 | 5 | YES |
| RELIGION | 4 | 7 | |
| POLITICS | 5 | 8 | |
| MPAA RATING | PG | R | |
| ROTTEN TOMATOES RATING | 40 | 25 | |
| OVERALL | 3 | 5 | |

(56) References Cited

U.S. PATENT DOCUMENTS

| | | | | |
|---|---|---|---|---|
| 5,684,918 | A | * | 11/1997 | Abecassis .............. A63F 13/10 348/14.01 |
| 5,696,869 | A | * | 12/1997 | Abecassis .............. G11B 7/14 348/E5.102 |
| 5,913,013 | A | * | 6/1999 | Abecassis .............. A63F 13/10 348/E5.102 |
| 5,973,683 | A | * | 10/1999 | Cragun ................ H04N 7/163 348/E7.061 |
| 6,208,805 | B1 | * | 3/2001 | Abecassis .............. G11B 7/14 348/E5.102 |
| 6,289,165 | B1 | * | 9/2001 | Abecassis .............. G11B 19/02 348/E5.105 |
| 6,684,240 | B1 | * | 1/2004 | Goddard ............... H04N 7/163 348/E7.061 |
| 6,704,028 | B2 | * | 3/2004 | Wugofski ............ H04N 7/165 348/E7.063 |
| 7,739,707 | B2 | * | 6/2010 | Sie ...................... G06Q 30/02 725/25 |
| 7,904,473 | B2 | | 3/2011 | Damick et al. |
| 8,032,471 | B2 | * | 10/2011 | Yahia ................... G06N 5/022 706/46 |
| 8,346,953 | B1 | | 1/2013 | Hew et al. |
| 8,364,685 | B2 | * | 1/2013 | Yahia ................... G06Q 10/10 707/748 |
| 8,843,953 | B1 | | 9/2014 | Dang et al. |
| 8,904,419 | B2 | * | 12/2014 | Vinson ............ H04N 21/44204 725/14 |
| 8,925,000 | B2 | | 12/2014 | Mooneyham |
| 8,955,060 | B2 | | 2/2015 | Zhang et al. |
| 8,984,550 | B2 | | 3/2015 | Craner et al. |
| 9,043,826 | B1 | | 5/2015 | Patil et al. |
| 9,049,483 | B2 | | 6/2015 | Mahan |
| 2006/0206912 | A1 | * | 9/2006 | Klarfeld .............. G11B 27/105 725/40 |
| 2007/0056014 | A1 | * | 3/2007 | Cheng ............... H04N 5/44543 725/134 |
| 2007/0143613 | A1 | * | 6/2007 | Sitch .................. H04W 4/22 713/171 |
| 2009/0164402 | A1 | * | 6/2009 | Yahia ................... G06N 5/022 706/46 |
| 2009/0171932 | A1 | * | 7/2009 | Yahia ................... G06Q 10/10 |
| 2013/0085917 | A1 | * | 4/2013 | Agarwal ............... G06Q 40/06 705/35 |
| 2013/0138644 | A1 | * | 5/2013 | Yahia ................. G06F 17/3053 707/733 |
| 2015/0067879 | A1 | | 3/2015 | Appalabattula et al. |
| 2016/0073172 | A1 | * | 3/2016 | Sharples ........... H04N 21/4126 725/53 |
| 2017/0169020 | A9 | * | 6/2017 | Yahia ................. G06F 17/3053 |

OTHER PUBLICATIONS

Net Nanny, 2015, available on the worldwide web at: http://www.netnanny.com/.

The Internet's best parental control software, 2015, available on the worldwide web at: https://www.qustodio.com/en/.

\* cited by examiner

| ATTRIBUTE | ALLOWABLE LIMIT | CONTACT LIMIT | MANDATORY |
|---|---|---|---|
| NUDITY | 2 | 5 | |
| VIOLENCE | 1 | 4 | |
| LANGUAGE | 1 | 3 | |
| ALCOHOL | 3 | 6 | |
| DRUGS | 1 | 4 | YES |
| RACISM | 1 | 5 | YES |
| RELIGION | 4 | 7 | |
| POLITICS | 5 | 8 | |
| MPAA RATING | PG | R | |
| ROTTEN TOMATOES RATING | 40 | 25 | |
| OVERALL | 3 | 5 | |

FIG. 3

CONTENT ACCESS CONTROL

FIELD OF THE INVENTION

The present invention generally relates to the control of access to media content.

BACKGROUND OF THE INVENTION

Systems and methods for the control of access to broadcast and/or stored media content are known in the art. Such systems and methods are commonly used by parents to limit access by their children to presumably inappropriate media content. The systems and methods typically rely on publicly available ratings, such as those provided by the Motion Picture Association of America (MPAA) or the British Board of Film classification (BBFC), to determine the suitability of a given media content item for viewing by an audience. Such ratings are typically expressed in terms of minimum recommended ages for viewers, such that they may be employed by access control systems to prevent access by underage viewers.

BRIEF DESCRIPTION OF THE DRAWINGS

The present invention will be understood and appreciated more fully from the following detailed description, taken in conjunction with the drawings in which:

FIG. 3 is an illustration of an exemplary viewing profile to be used by the method of FIG. 2.

DESCRIPTION OF EXAMPLE EMBODIMENTS

Overview

Figure 1:
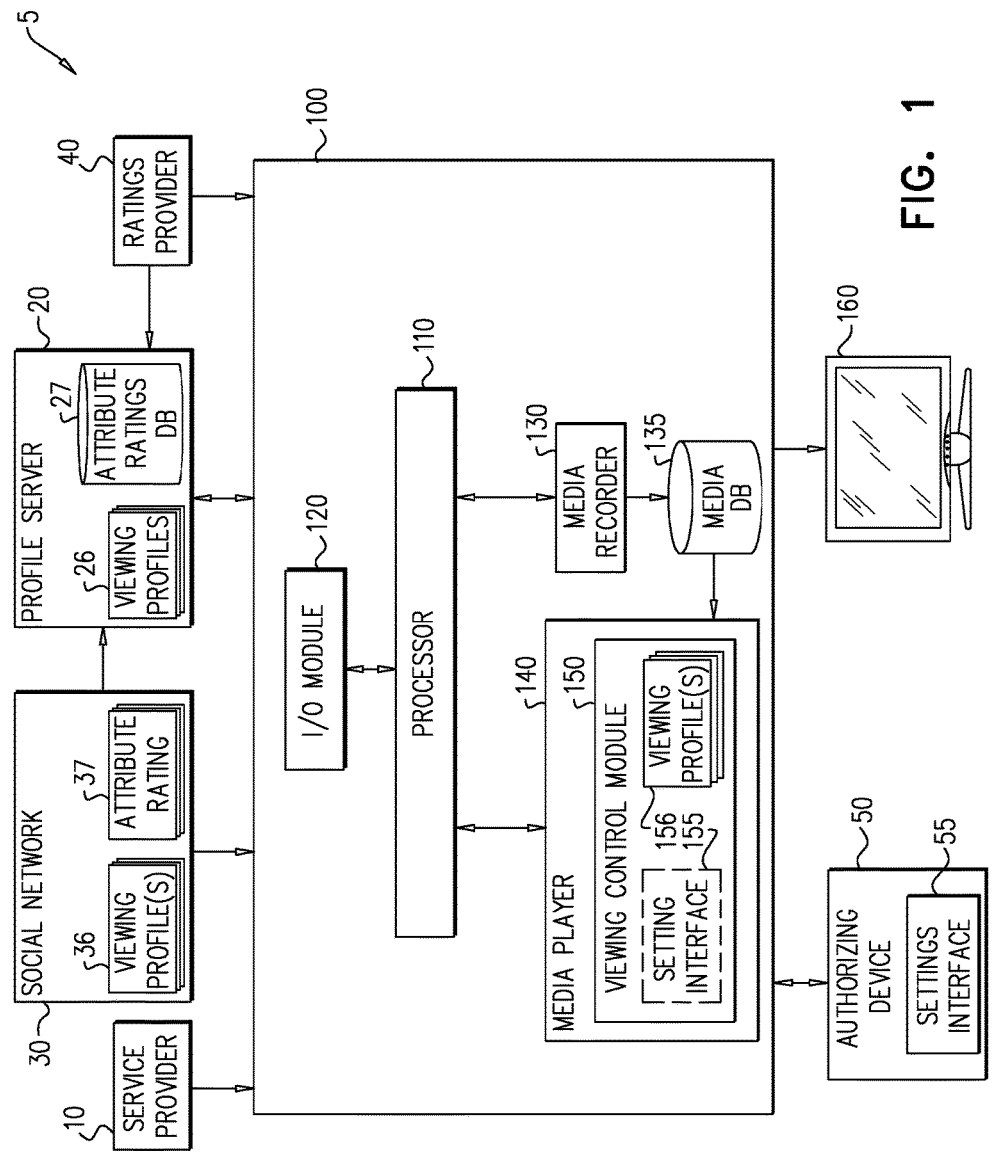
FIG. 1 is simplified pictorial illustration of an exemplary media access control system, constructed and operative in accordance with embodiments described herein.

A method for controlling access to media content includes defining a viewing profile for at least one viewing user according to a multiplicity of attributes associated with the media content, assigning allowable limits to the multiplicity of attributes in the viewing profile, where each of the allowable limits indicates a rating limit for one of the multiplicity of attributes, receiving attribute ratings associated with a media content item, where each of the attribute ratings is associated with one of the multiplicity of attributes, determining viewing permissibility for the media content item by the at least one viewing user by comparing the attribute ratings with the allowable limits, and based on the viewing permissibility, allowing or disallowing the at least one viewing user to view the media content item.

A method for controlling access to media content includes defining at least one authorizing user, defining a viewing profile for at least one viewing user according to at least one attribute associated with the media content, defining a contact range in the viewing profile, where the contact range is a range of values for ratings of the at least one attribute, receiving at least one attribute rating associated with the at least one attribute determining whether the attribute rating is within the contact range, and if the attribute rating is within the contact range, forwarding an authorization request to an authorizing device associated with the authorizing user, where the authorization request is a request for permission to play the media content, receiving a response from the authorizing device, and if the response is positive, allowing access to the media content.

Detailed Description of Example Embodiments

It will be appreciated that a single rating may provide insufficient granularity to properly control media content access according to the values of the person(s) entrusted with such control. For example, movies may be issued an MPAA "PG-13" for vastly different reasons, based on attributes such as depictions of violence, use of language, treatment of drug abuse, etc. Persons exercising access control, e.g., parents of viewing children, may have different considerations regarding the suitability of each of these attributes as they relate to the viewing audience. Some viewers may be more sensitive to specific attributes based on personality or past experience. The persons exercising access control may have similarly different sensitivities stemming from a variety of reasons. A first parent may find the level of violence depicted in a movie to be the most significant measure of suitability for viewing by their children; a second parent may be less concerned with violence, and more so with the language used in the movie. Given the population of all available PG-13 movies, it's unlikely that both parents would uniformly agree as to the suitability for viewing by their respective children of each movie in the population.

In accordance with embodiments described herein, a granular approach to media access control may be implemented using viewing profiles reflecting multiple attributes. Profiles may be created or selected by an authorizing user (typically, although not necessarily, a parent) on behalf of a viewing user (typically, although not necessarily, a child). In accordance with embodiments described herein, there may be at least three types of viewing profiles: simple/default profiles, advanced/custom profiles, and social profiles. Simple/default profiles may typically be provided as a convenience by a service provider, and may have a descriptive name to allow users to easily select a default profile in line with their values. For example, users may be offered to select from among profiles such as "Liberal", "Conservative", "No Violence", etc. Advanced/custom profiles may be defined by the authorizing user; and social profiles may be defined and made available for sharing by a user or group of users.

Reference is now made to FIG. 1 which is a simplified pictorial illustration of an exemplary media access control system 5, constructed and operative in accordance with embodiments described herein. System 5 comprises computing device 100 and media content presentation device 160. Media content presentation device 160 may be implemented using any suitable means for presenting media content to a viewing user such as, but not limited to, a television, a personal computer (PC) with integrated or peripheral display screen and audio speaker(s), a laptop computer, a smartphone, etc. Computing device 100 may be implemented as any suitable computing device such as, but not limited to, a personal computer, laptop computer, smartphone, set-top box, etc., that may be operative to control access media content to be presented on media content presentation device 160. It will be appreciated by one of ordinary skill in the art that while computing device 100 and media content presentation device 160 are depicted in FIG. 1 as separate units, in some embodiments, they may be implemented as a single integrated unit.

It will be appreciated by one of skill in the art that computing device 100 comprises hardware and software components that may provide at least the functionality of the embodiments described herein. For example, computing device 100 may comprise at least processor 110, I/O module 120, and media player 140. I/O module 120 may be implemented as a transceiver or similar means suitable for transmitting and receiving data between computing device 100 and another device.

Media player 140 may be any suitable application implemented in software and/or hardware that may be operative to play media content on media content presentation device 160. Media content presentation device 160 may be implemented using any suitable means for presenting media content such as, but not limited to, a television or a display screen in association with one or more associated audio speakers. The media content played by media player 140 may be received, for example, directly from service provider 10 via I/O module 120. Alternatively, or in addition, media content received from an external source may be recorded by media recorder 130 and stored in media content database 135 for later use by media player 140. Alternatively, or in addition, the media content may be received in the form of a removable data device, such as, for example, a DVD or a disk-on-key.

It will be appreciated that computing device 100 may comprise more than one processor 110. For example, one such processor 110 may be a special purpose processor operative to execute media player 140. Media player 140 comprises viewing control module 150. Viewing control module 150 may be implemented in software and/or hardware and may be employed as necessary by media player 140 to control access to media content to be played on media content presentation device 160.

Viewing control module 150 comprises one or more viewing profiles 156, where each of the viewing profiles is associated with a user or group of users of media content presentation device 160. Viewing control module 150 may also comprise settings interface 155. Settings interface 155 may be configured to enable an "authorizing user", i.e., a user charged with authorizing access to media content by one or more "viewing users", to define viewing profiles 156 by selecting a simple/default profile or a social profile. Alternatively, or in addition, the authorizing user may use settings interface 155 to define viewing profiles 156 as an advanced/custom profile according to tolerance levels for a list of attributes, such as, but not limited to, violence, language, drug abuse, etc. In accordance with embodiments described herein, viewing control module 150 may control access by the viewing user or group of viewing users to media content to be played on media content presentation device 160 according to the associated viewing profile 156.

Social profiles received from external sources may also be used to define viewing profiles 156. For example, system 5 may also comprise one or more social networks 30. Social network 30 comprises one or more viewing profiles 36 that are defined within the context of a social network such as Facebook or Twitter. Alternatively, or in addition, social network 30 may be implemented as a third party application that gathers and collates information from other social network sources to generate viewing profiles. An authorizing user may use settings interface 155 to download a viewing profile 36 to computing device 100 to set up and define a viewing profile 156 according to the values of a social network that he/she trusts. Settings interface 155 may also be configured to enable the authorizing user to modify viewing profile 156 after previously defining it according to a downloaded viewing profile 36, thereby effectively changing viewing profile 156 from a social profile to an advanced/custom profile. In any case, it will be appreciated by one of ordinary skill in the art that there may be overlap between social profiles and advanced/custom profiles. Just as a downloaded social profile may be modified as an advanced/custom profile; an advanced/custom profile may also be uploaded and shared as a social profile. Settings interface 155 may also be configured to periodically update viewing profile 156 per new downloaded updated versions of viewing profile 36 as they become available, thereby maintaining consistency between viewing profile 156 and a current version of its source viewing profile 36.

It will also be appreciated by one of ordinary skill in the art that the representation of settings interface 155 as an integrated component of computing device 100 may be exemplary. Alternatively, profile 156 may be managed remotely in the cloud (i.e., on a cloud server) and queried on demand. Similarly, some or all of the functionality of viewer control module 150 for ensuring that content viewed is in accordance with a viewing profile alternatively, or in addition, be executed in the cloud with signaling back to computing device 100 and/or media content presentation device 160 to disable playback as required.

Social network 30 may also comprise attribute ratings database 37 which may comprise media content ratings provided by the users of the community and/or other ratings mechanisms. As will be described hereinbelow, an authorizing user may download attribute ratings from database 37 to determine whether a given media content is suitable for viewing per viewing profile 156 on computing device 100.

System 5 may also comprise a profile server 20 that comprises viewing profiles 26. Profile server 20 may be operative to facilitate the receiving and sharing of viewing profiles 26 between participating computing devices 100. In accordance with embodiments described herein, profile server 20 may provide service to a community of users that wish to define and share viewing profiles 26. A first authorizing user in the community may use settings interface 155 to define a viewing profile 156. In accordance with embodiments described herein, the authorizing user may add identifying and/or explanatory details to viewing profile 156 and then upload it to profile server 20, where the uploaded profile is saved as a viewing profile 26. It will be appreciate that similar methods may be used to upload viewing profiles 36 to social network 30.

A second authorizing user in the community may download viewing profile 26 to another computing device 100 to set up and define a viewing profile 156 according to the values of a person that he/she trusts, i.e., the first authorizing user. Profile server 20 may also comprise attribute ratings database 27 which may comprise media content ratings provided by the users of the community and/or other ratings mechanisms. It will be appreciated by one of ordinary skill in the art that after being defined based on viewing profiles 26, viewing profiles 156 may be also modified and/or periodically updated using similar methods as described hereinabove with regard to viewing profiles 156 based on viewing profiles 36. As will be described hereinbelow, a given authorizing user in the community may download attribute ratings from database 27 to determine whether a given media content is suitable for viewing per viewing profile 136 on computing device 100.

System 5 may also comprise ratings provider 40. Ratings provider 40 may be any generally accessible service that provides at least one rating for a media content item. For example, ratings provider 40 may be the MPAA, the Internet media database (IMDB), or the Common Sense Media rating site. Alternatively, or in addition, as will be described hereinbelow, a given authorizing user may also download attribute ratings from ratings provider 40 to computing device 100 to determine whether a given media content is suitable for viewing per viewing profile 156.

System 5 may also comprise authorizing device 50. Authorizing device 50 may be implemented as any suitable computing device such as, for example, a smartphone, a personal computer, or a tablet computer. As such, it will be appreciated by one of ordinary skill in the art that authorizing device 50 may comprise means for computer processing such as a processor, and means for communicating with other devices such as a transceiver. In accordance with embodiments described herein, authorizing device 50 may also comprise settings interface 55. Settings interface 55 may be configured to provide generally similar functionality as settings interface 155 when in communication with computing device 100. Alternatively, or in addition, as will be described hereinbelow, in some instances, authorizing device 50 may be used by a given authorizing user to decide whether a given media content item is suitable.

Figure 2:
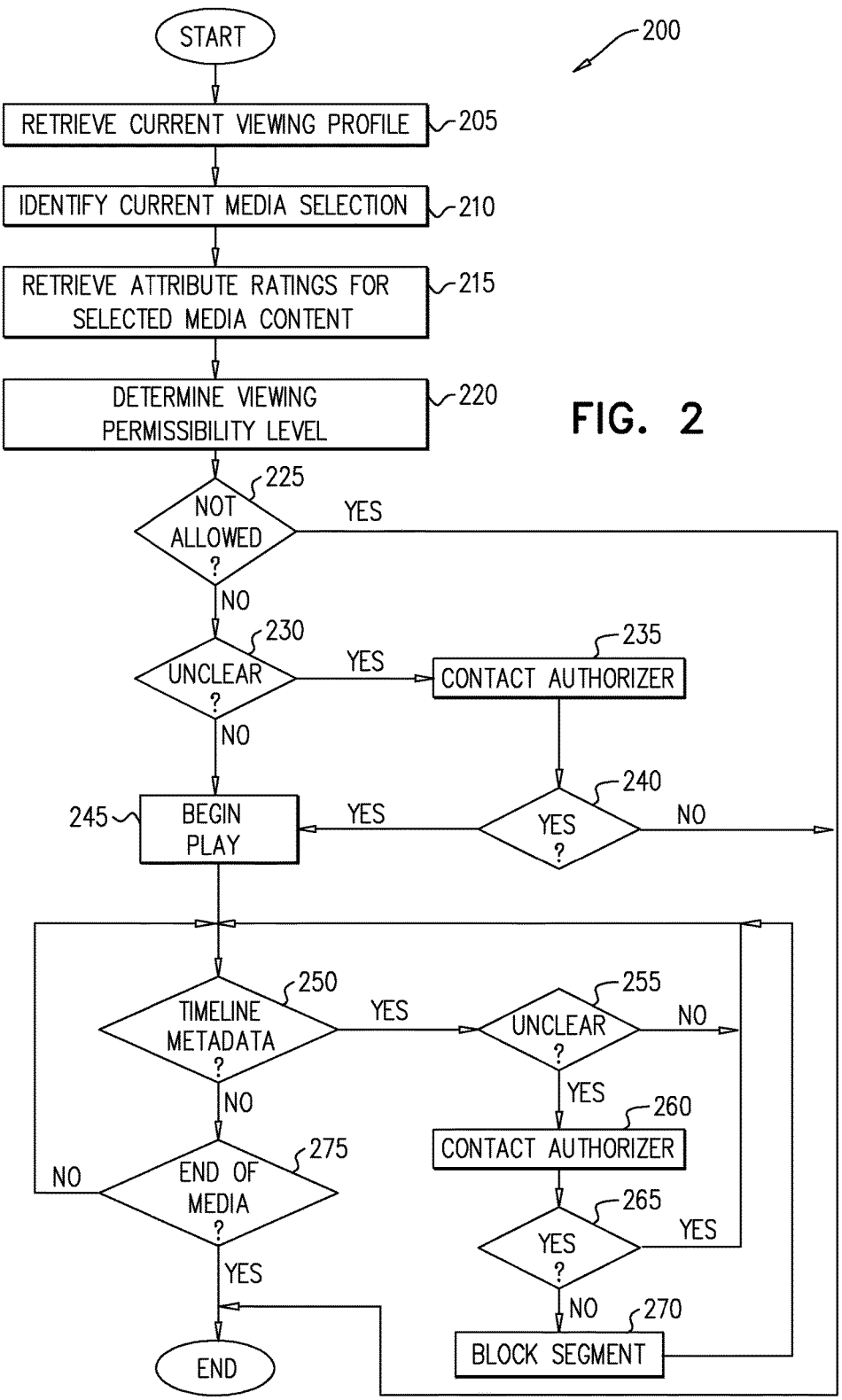
FIG. 2 is a flowchart of a media access control method performed by the exemplary system of FIG. 1.

Reference is now made to FIG. 2 which illustrates a media content access control process 200, constructed and operative in accordance with embodiments described herein. Process 200 may be used by viewing control module 150 to control access to media content before and/or while, it is played by media player 140. Viewing control module 150 may retrieve (step 205) a current viewing profile 156 in accordance with a current user using media player 140 to view media content. It will be appreciated that computing device 100 may be configured with means for identifying users of media player 140. For example, viewing users may be required to login to use computing device 100 and/or media player 140. Computing device may also be configured with diagnostic functionality such as is known in the art that may be suitable for identifying viewing users without an explicit login.

Viewing control module 150 may identify (step 210) the current media content selection (e.g., the current media content received from service provider 10 or a media content item retrieved from media content DB 135) according to any suitable means such as known in the art. For example, an identifying code may be embedded in the media content's metadata, the identifying code may be derived according to a program schedule provided by service provider 10, and/or added by the user when recorded by media recorder 130.

Viewing control module 150 uses the identifying code to retrieve (step 215) attribute ratings for the selected media content, i.e., the media content identified in step 210. It will be appreciated by one of skill in the art that viewing control module may be operative to retrieve attribute ratings from any of profile server 20 (from attribute ratings database 27), from social network 30 (attribute ratings 37), ratings provider 40, and/or a combination thereof. It will further be appreciated that some attribute ratings, such as an MPAA rating, may be included in metadata provided by service provider 10 along with the media content.

Reference is now made also to FIG. 3 which illustrates an exemplary viewing profile 300, constructed and operative in accordance with embodiments described herein. Viewing profile 300 comprises columns of attributes 310 with associated ratings for allowable limits 320 and contact limits 330. It will be appreciated by one of ordinary skill in the art that viewing profile 300 may be substantially similar, although not necessarily identical, to viewing profiles 26, 36, and 156. For example, the component attributes and/or the scale used to rate them may be somewhat different. Accordingly, when initializing viewing profile 300 on the basis of an externally sourced viewing profile, such as, for example, viewing profiles 26, 36, and 156, it may be necessary to ignore, scale, and/or convert some of the component values in order to successfully initialize viewing profile 300.

In accordance with the exemplary embodiment of FIG. 3, some of the attribute ratings may be expressed in terms of a 1-10 scale, where higher ratings are associated with more problematic content with respect to the associated attribute 310. For example, the entry of "violence" for attribute 310 is associated with a rating of "1" for allowable limit 320, thereby indicating the lowest tolerance for violence in viewing profile 300; any rating above "1" should not be allowed. The rating of "2" for allowable limit 320 for the entry of "nudity" for attribute 310 indicates slightly more tolerance for this attribute in media content. It will be appreciated that the values of these ratings may be assigned subjectively in accordance with the sensitivities and values of the person or persons that assign(s) the ratings.

Further in accordance with exemplary embodiment of FIG. 3, different numerical scales may be used to express allowable limits 320. For example, "Rotten Tomatoes" is a media content review website that aggregates quality reviews of movies and provides overall scores expressed on a scale of one to a hundred. Per the exemplary entry for allowable limit 320 in FIG. 3, the associated media content may not be allowed for viewing unless it has a minimum Rotten Tomatoes score of "40".

Still further in accordance with exemplary embodiment of FIG. 3, some of the attribute ratings may be expressed in non-numerical format. For example, the entry of "MPAA" for attribute 310 is associated with a spectrum of ratings issued by the indicated organization, i.e., the MPAA. Accordingly, per the rating of "PG" for allowable limit 320, media content with a mature MPAA rating, e.g., PG-13, R, etc. may not be allowed for viewing. It will be appreciated that by one of ordinary skill in the art that other expressions of attribute ratings may be supported by the embodiments described herein.

Returning to FIG. 2, viewing control module 150 may determine (step 220) a viewing permissibility level based on viewing profile 156. Step 220 comprises comparing the entries in viewing profile 156 to one or more of the attribute ratings received from external ratings sources for the media content, such as one, or a combination thereof, of service provider 10, social network 30, profile server 20, and/or ratings provider 40.

It will be appreciated that the embodiments described herein may support a variety of algorithms for performing step 220. For example, in accordance with one exemplary embodiment, the values for all of the attributes 310 retrieved in step 215 may be required to be equal to, or lower than, their associated allowable limit 320 in order for viewing control module 150 to deem the media content "permissible".

In accordance with another exemplary embodiment, viewing control module 150 may calculate an average rating based on a straight average or a weighted average of the attribute ratings. This average rating may then be compared to an "overall" rating as shown in the last entry in the exemplary embodiment of FIG. 3.

In accordance with another exemplary embodiment, a combined approach may be used to determine permissibility. For example, as shown in FIG. 3, the entry for mandatory 340 has been designated as "YES" for two attributes, 310:

"drugs" and "racism", both of which have an allowable limit 320 of "1". In accordance with the combined approach, viewing control module 150 may calculate an average or weighted average for comparison to the overall rating as described hereinabove. However, in addition to the overall rating comparison, "mandatory attributes" may also be compared. Accordingly, regardless of the results of the comparison with the overall rating, the received attribute ratings for attributes 310 designated as mandatory (i.e. their associated entries for mandatory 340 are "YES"), must be lower or equal to their associated allowable limits in order for viewing control module 150 to determine that the media content is permissible.

It will be appreciated by one of ordinary skill in the art that step 220 is not limited by the specific determination algorithms described hereinabove. The embodiments described herein may support the use of any suitable means for using viewing profiles 156 and received attribute ratings to determine the permissibility of viewing media content. It will similarly be appreciated that viewing control module 150 may also be configured with one or more default policies to determine the permissibility of viewing media content in the absence of one or more of attributes 310. For example, per the exemplary viewing profile 300 of FIG. 3 there is an attribute 310 for "nudity". If no rating for "nudity" is received from service provider 10, social network 30, profile server 20, or ratings provider 40, then viewing control module 150 may be configured with a default policy, e.g., the default may be not permissible, or permissible. It will also be appreciated that such defaults may be configured for multiple attributes, and that such defaults may or may not be correlated with attributes 310 designated as mandatory per the value of an associated mandatory 340.

If the media content is not allowed (step 225), i.e. the result of step 220 is not permissible, process 200 may end.

It will be appreciated that as per the embodiments described hereinabove, viewing control module 150 may determine that the permissibility of viewing media content as a binary decision between two options; i.e., a media content item may be either allowed for viewing, or not allowed for viewing. In accordance with embodiments described herein, there may be a third option, where the permissibility of viewing a given media content item is dependent on additional real-time, or near real-time, input.

Returning to FIG. 3, in accordance with embodiments described herein, in addition to allowable limit 320, each attribute 310 may also have an associated contact limit 330. Contact limits 330 may be used to define an attribute range that may be permissible with additional input from the authorizing user. For example, as per the exemplary embodiment of FIG. 3, the first listed attribute 310, "Nudity" may have an allowable limit 320 of "2" and a contact limit 330 of "5". Accordingly, as described hereinabove, if the received attribute rating is "2" or lower, viewing control module 150 may determine that the associated media content item is permissible. In accordance with embodiments described herein, if the received attribute rating is "5" or lower (per contact limit 330), viewing control module 150 may contact the authorizing user to make a decision whether or not to allow the viewing in real-time as the viewing user views, or attempts to view, the media content. It will therefore be appreciated that when support for contact limits 330 is provided, there may be three possible results for step 220 of process 200: "allowed" (as defined by allowable limit 320), "unclear" (as defined by contact limit 330), and "not allowed" (where neither allowed nor unclear apply).

Returning to FIG. 2, viewing control module 150 may check whether the permissibility is "unclear" (step 230). For example, per the exemplary viewing profile 300 of FIG. 3, allowable limit 320 for the overall rating is "3" and contact limit 330 is "5". If the overall value calculated for the received ratings is "4" or "5", the permissibility may be "unclear". In such a case, viewing control module 150 may contact (step 235) authorizing device 50 with a request for the user of device 50 (i.e., the authorizing user) to decide whether or not to authorize viewing of the media content item (i.e., to make it permissible). If a positive answer is received from authorizing device 50 (step 240), then viewing control module 150 may allow media player 140 to begin playing (step 245) the media content item. Otherwise process 200 may end.

It will be appreciated by one of ordinary skill in the art that viewing control module 150 may employ I/O module 120 to communicate with authorizing device 50. It will similarly be appreciated that authorizing device 50 may be configured with similar means for receiving the request from viewing control module 150 and returning an answer to I/O module 120. It will also be appreciated that authorizing device 50 may be configured with suitable means to process the request received from viewing control module 150. For example, authorizing device 50 may also comprise a software and/or hardware media authorizing application (not shown) configured to provide details of the relevant media content and to prompt a user for a decision regarding permissibility. It will be appreciated that, depending on the implementation of authorizing device 50, and/or other design considerations, the authorizing application may be a mobile application, a PC-based standalone application, and/or a browser based web application.

In accordance with some embodiments described herein, viewing control module 150 may be configured to store authorization answers received from authorizing users, and/or to forward the answers to social network 30, profile server 20, and/or ratings provider 40 for storage and aggregation. Other users using viewing profile 300 as a social profile may then use the stored answer(s) as a default value for future authorization requests. For example, the authorizing user may be prompted to confirm the default value, or may choose not to provide an answer for processing in step 240. Authorizing device 50 may also not be available to receive the request from step 235. The default value may, for example, be implemented as another attribute 310, providing a default answer of "yes" or "no" for authorization requests based on historical authorization answers provided by one or more other users. Certain activation thresholds may also be defined. For example, viewing control module 150 may require answers from a minimum number of other authorizing users (e.g., at least two, five, ten, etc. other authorizing users) before the historical authorization answers may be used as a default. Similarly, a consensus (e.g., at least 60, 70, or 75% of the authorizing users may have to have provided the same answer) may be required before using the historical authorization answers.

In accordance with some embodiments described herein, process 200 may alternatively be configured to perform step 235 regardless of the outcome of step 230, i.e., to contact authorizing device 50 each time new content is accessed even if it is permissible per the relevant viewing profile 300. The authorizing user may thereby be effectively given the option to allow or disallow viewing, regardless of the profile settings. Accordingly, an authorizing user, such as a parent, can prevent the viewing of any program regardless of its permissibility vis-à-vis a viewing profile. Similarly, if viewing control module 150 does block viewing based on viewing profile 300, the authorizing user may "overrule" viewing control module 150 and allow the viewing. This capability is independent of whether content was blocked or not.

After step 245, further processing may be dependent on whether or not timeline metadata ratings are available for the media content item (step 250). Timeline metadata ratings may be any suitable attribute ratings that are associated with specific points in the timeline of the media content item. For example, timeline metadata ratings may provide an indication that a particular scene in the media content item may be contain, unusually strong language or violence in comparison with the rest of the media content item. Such timeline metadata may be included along with the data stream of the media content item from service provider 10. Alternatively, or in addition, it may be provided by profile server 20, social network 30 and/or ratings provider 40. It is conceivable in such cases that the authorizing user may permit the viewing user to view the media content item, but wish to prevent viewing of this particular scene, and/or at least reserve judgment regarding its permissibility until such time as the scene is played.

Accordingly, if such timeline metadata is available (step 250), as the media content item is played, viewing control module 150 may check to see whether a point in the associated timeline indicates that the permissibility is "unclear", as described hereinabove. If the point is not unclear (step 255), process 200 may loop back to step 250 to check for additional timeline metadata. If the permissibility is unclear (step 255), viewing control module 150 may contact (step 260) the authorizing user as described hereinabove with respect to step 235.

If the response from the authorizing device is "YES" (step 265), i.e., the authorizing user has authorized viewing of the particular scene, processing may loop back to step 250. Otherwise (step 265), viewing control module 150 may block (step 270) the viewing of the video segment associated with the particular scene according to the timeline metadata. It will be appreciated by one of skill in the art that systems and methods for blocking particular video segments are known in the art. Processing may then loop back to step 250. It will be appreciated that while waiting for step 265, process 200 may be operative to display a message informing the viewing user that the current scene is under review by the authorizing user. Alternatively, process 200 may be configurable to continue playing the scene while it is under such review. Process 200 may also have a timeout feature that would configurably default the result of step 265 to either "Yes" or "No" if an answer is not received from the authorizing user within a configurable amount of time.

It will be appreciated by one of ordinary skill in the art that the embodiments described herein may also provide support for cases where the timeline metadata ratings indicate that the particular scene should not be permitted at all, i.e., where the received timeline metadata rating indicates that the particular scene is neither "allowable", nor "unclear". In such a case, viewing control module 150 may be configured to block (step 270) the video segment without contacting the authorizing user as per step 260.

It will also be appreciated that viewing control module 150 may be configured to inform the viewing user when a media content item and/or a video segment has been blocked, either autonomously by viewing control module 150 or the authorizing user. In such a case, the authorizing user may use computing device 100 or authorizing device 50 to override viewing control module 150. It will similarly be appreciated that the authorizing user may use either authorizing device 50 or computing device 100 to respond to requests from viewing control module 150.

If there is no timeline metadata, or if there is no more timeline metadata to consider (step 275), process 200 may end. Otherwise, processing may loop back to step 250.

It will be appreciated by one of ordinary skill in the art, that the embodiments described hereinabove, may also support proactive non-real-time viewing and review by the authorizing user for media content that is saved in media database 35 for later viewing. For example, the authorizing user may view the media content item in advance of the viewing user in order to block viewing of video segments in the saved media content before the viewing user seeks to view it. It will similarly be appreciated that in addition to blocking playback of content that is not permissible, it may also be possible to block discovery of the content, e.g. via search or other mechanisms. With such "pre-authorization" the authorizing user may therefore be able to curate a selection of content appropriate for consumption by the target audience, e.g., a parent may be able to create a selection of content for consumption by his or her family, without exposure to content that may be deemed to be inappropriate.

In accordance with embodiments described herein, settings interface 155 may support a "social similarity" option for the selection of social profiles to use as viewing profiles 156. When the social similarity option is selected, viewing profile 156 may be automatically configured using settings derived according to the preferences of other households in similar geography or demography for viewing by viewers of similar age and gender. When using this option, the authorizing user may specify the gender and age for the profile. This information will be communicated back to profile server 20, which may then determine and provide an appropriate profile 26 based on the locality of the home and the provided details. For example, using geolocation information already available to service provider 10, profile server 20 may consider simple and/or advanced viewing profiles 26 for matching gender and general age within a configured locality distance or demography. In accordance with an exemplary embodiment described herein, profile server 20 may then discard the top 10% and bottom 10% extremes and average the remaining values to define a viewing profile 26 to be downloaded to computing device 100. It will be appreciated by those of skill in the art that other algorithms to determine social similarity may be supported by the embodiments described herein.

In accordance with embodiments described herein, a downloaded viewing profile 26 may be autonomously updated as an associated user ages. For example, if a "Conservative five year old" viewing profile has been selected for a child, it may be autonomously incremented to the "Conservative six year old" viewing profile on the child's birthday. This may be implemented as an option in the profile set-up; some authorizing users may wish to manually increment their children's profile (either on a regular basis or prompted by the system at appropriate intervals to review).

Alternatively, or in addition, social network 30 may be leveraged to define a viewing profile in accordance with the social similarity option. For example, if the authorizing user has associated a social network account with computing device 100, the social similarity option may be configured to generate a viewing profile based on the preferences of the authorizing user's social connections instead of the presumably more generic, distance/demography based method described hereinabove.

In accordance with embodiments described herein, viewing control module 150 may be configured to optionally ask questions about the viewer's perception of a media content item (after viewing) and upload the answers for incorporation in attribute ratings database 37.

It will be appreciated by one of skill in the art that the embodiments described herein may facilitate a granular approach to the control of media content access according to the values of the person(s) entrusted with such control. The authorizing user may have access to a non-trivial list of content attributes, instead of a single rating. The authorizing user may configure a viewing profile based on these specific non-trivial attributes. The authorizing user may use social networks to select viewing profiles from members of their social network. The authorizing user may create and share viewing profiles. Viewing profiles may be dynamically defined/assigned based on viewer gender and age using aggregated data from geography, demography, and/or other inputs. Real-time communication with authorizing device 50 enables an authorizing user to immediately approve an item that might otherwise be blocked (or block an item that might otherwise be allowed). The control function provided by viewing control module 150 may also be leveraged to contribute to aggregated ratings in attribute ratings database 37 based on questions regarding an authorizing user's perception of the media content.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for controlling access to media content, the method implemented on a computing device and comprising:
   defining a viewing profile for at least one viewing user according to a multiplicity of attributes associated with said media content;
   assigning allowable limits and contact range limits to said multiplicity of attributes in said viewing profile, wherein each of said allowable limits indicates a rating limit for one of said multiplicity of attributes, wherein each of said contact range limits indicates permissible rating limit with additional input from an authorizing user for said multicity of attributes;
   receiving a selection of a media content item, wherein said selection is associated with said at least one viewing user;
   receiving attribute ratings associated with the media content item, wherein each of said attribute ratings is associated with one of said multiplicity of attributes;
   determining viewing permissibility for said media content item by said at least one viewing user by comparing a weighted average of said attribute ratings with a weighted average of said allowable limits and a weighted average of said contact range limits, wherein comparing said weighted average of said attribute ratings comprises determining that said weighted average of said attribute ratings is one of the following:
      within said weighted average of said allowable limits, between said weighted average of said allowable limits and said weighted average of said contact limits, and beyond said weighted average of said contact limits; and
   based on comparing said weighted average of said attribute, allowing or disallowing said at least one viewing user to view said media content item, wherein allowing or disallowing said at least one viewing user comprises:
      allowing, in response to determining that said weighted average of said attribute ratings is within said weighted average of said allowable limits, said at least one viewing user to view said media content item,
      allowing, in response to determining that said weighted average of said attribute ratings is between said weighted average of said allowable limits and said weighted average of said contact limits, said at least one viewing user to view said media content item upon receiving a response from said authorizing user, and
      disallowing, in response to determining that said weighted average of said attribute ratings is beyond said weighted average of said contact limits, said at least one viewing user to view said media content item.

2. The method according to claim 1 and wherein said assigning comprises:
   downloading at least one social profile from at least one external source, wherein said social profile comprises said allowable limits; and
   generating said viewing profile from said social profile.

3. The method according to claim 2 and wherein said at least one external source is a social network.

4. The method according to claim 2 and wherein:
   said downloading comprises downloading at least two said social profiles; and said generating comprises generating said viewing profile from said at least two social profiles.

5. The method according to claim 2 and wherein:
   said downloading comprises downloading updates of said at least one social profile from said at least one external source;
   and said generating comprises updating said viewing profile in accordance with said updates.

6. The method according to claim 1 and further comprising:
   uploading said viewing profile to be shared as a social profile to define another viewing user's said viewing profile.

7. The method according to claim 1 and wherein said determining viewing permissibility further comprises:
   designating one or more of said allowable limits as mandatory limits; and comparing each of said mandatory limits with an associated said attribute rating, wherein said viewing permissibility is a function of both said weighted average of said allowable limits and said mandatory limits.

8. The method according to claim 1 and further comprising:
associating said viewing profile with an age or range of ages; and
associating said viewing profile with said viewing user according to an age of said viewing user.

9. The method according to claim 1 and further comprising:
forwarding an authorization request to an authorizing device associated with said authorizing user, wherein said authorization request is a request for permission to play said media content, and said authorizing device is not said computing device;
receiving said response to said authorization request; and
upon determining that said response is positive, allowing access to said media content.

10. The method according to claim 9 and wherein said receiving a response comprises defining a default response to said authorization request, wherein:
said default response is either "Yes" or "No", and
said default response is used in accordance with a timeout feature if no said response is received from said authorizing device.

11. The method according to claim 1 and further comprising:
receiving timeline attribute ratings associated with a segment of a media content item, wherein each of said timeline attribute ratings is associated with one of said multiplicity of attributes;
determining viewing permissibility for said segment of media content item by said at least one viewer by comparing said timeline attribute ratings with said allowable limits; and
based on said viewing permissibility for said segment of media content item, allowing or disallowing said at least one viewing user to view said segment of media content item.

12. The method according to claim 11 and further comprising:
forwarding a segment authorization request to an authorizing device associated with said authorizing user, wherein said segment authorization request is a request for permission to play said segment of media content;
receiving a response to said segment authorization request; and
upon determining that said response to said segment authorization request is positive, allowing access to said segment of media content.

13. A computing device comprising:
a processor;
an I/O module operative to at least receive a viewer selection of a media content item and attribute ratings associated with said media content;
a media player executed by said processor and configured to play said media content; and
a viewing control module executed by said processor and operative to:
define a viewing profile with a multiplicity of allowable limits and contact range limits for attributes associated with said media content, wherein said contact range limits indicates permissible attribute range with additional input from an authorizing user for said attributes;
determine viewing permissibility for said media content based on a comparison of a weighted average of said allowable limits and a weighted average of said attribute ratings and a weighted average of said contact range limits, wherein said weighted average of said attribute ratings is compared to determine that said weighted average of said attribute rating is one of the following: within said weighted average of said allowable limits, between said weighted average of said allowable limits and said weighted average of said contact limits, and beyond said weighted average of said contact limits, wherein said viewing control module being operative to determine said viewing permissibility comprises said viewing control module operative to:
allow, in response to determining that said weighted average of said attribute ratings is within said weighted average of said allowable limits, viewing of said media content item,
allow, in response to determining that said weighted average of said attribute ratings is between said weighted average of said allowable limits and said weighted average of said contact limits, viewing of said media content item upon receiving a response from said authorizing user, and
disallow, in response to determining that said weighted average of said attribute ratings is beyond said weighted average of said contact limits, viewing of said media content item, and
control playing of said media content by said media player according to said viewing permissibility.

14. The computing device according to claim 13 and wherein:
said I/O module is operative to communicate with an authorizing device associated with an authorizing user; and
said viewing control module is configured to use said I/O module to receive instructions from said authorizing device to further define said viewing permissibility.

* * * * *